United States Patent [19]

Föller et al.

[11] Patent Number: 5,272,921
[45] Date of Patent: Dec. 28, 1993

[54] PROBE FOR MONITORING LIQUID

[75] Inventors: Werner Föller, Stuhr; Helmut Willenbrock, Achim; Wolfgang Behnken, Delmenhorst, all of Fed. Rep. of Germany

[73] Assignee: GESTRA Aktiengesellschaft, Bremen, Fed. Rep. of Germany

[21] Appl. No.: 27,229

[22] Filed: Mar. 5, 1993

[30] Foreign Application Priority Data

Mar. 9, 1992 [DE] Fed. Rep. of Germany ....... 4207396
Dec. 3, 1992 [DE] Fed. Rep. of Germany ....... 4240608

[51] Int. Cl.$^5$ .............................. 324 448; G01F 23/22
[52] U.S. Cl. ................................... 73/304 R
[58] Field of Search ........................ 73/304 R; 324/448

[56] References Cited

U.S. PATENT DOCUMENTS 2,815,663 12/1957 Lupfer ............................... 73/304 X
2,894,390 7/1959 Talbot ............................... 73/304 X
4,507,521 3/1985 Goellner ............................. 73/304 X
5,031,452 7/1991 Dobson et al. ...................... 73/304 R

FOREIGN PATENT DOCUMENTS 2744864 10/1979 Fed. Rep. of Germany .
3026342 10/1979 Fed. Rep. of Germany .

*Primary Examiner*—Daniel M. Yasich
*Attorney, Agent, or Firm*—Collard & Roe

[57] ABSTRACT

A probe for monitoring a liquid level has a one-piece insulation sheath extended within the probe casing and positioned far beyond the end of a contact pressure spring that is removed from the liquid. This contact pressure spring has an associated spring abutment formed by either a sleeve or a cap surrounding the insulation sheath. In the probe casing, lengthy sections of insulation are present such that functional interferences are avoided. The probe casing has large-dimensioned ventilation apertures for preventing moisture films.

10 Claims, 2 Drawing Sheets

5,272,921

PROBE FOR MONITORING LIQUID

BACKGROUND OF THE INVENTION

1. Field of the Invention

The present invention relates to a probe for monitoring the level of a liquid.

2. The Prior Art

PFTE (polytetrafluoroethylene), because of its resistance to high temperatures and chemical resistance, has been found to be a particularly advantageous material for insulation sheaths of probes. However, PFTE is not completely impermeable, for example, to water vapor. It has been found that water molecules of hot steam under excess pressure diffuse through the insulation sheath of the probe and that moisture gets in this way into the casing of the probe, where the moisture deposits as a film.

In connection with a known probe (German Patent No. 2,744,864), such a film of moisture causes a leakage current between the end of the insulation sheath and the casing of the probe, acting as the probe housing, which current interferes with the function. Particularly, with sensor electrodes that are long on the container side, only a narrow radial gap is provided between the abutment of the spring on the electrode side and the casing of the probe. Thus, in the event of pendulum-like movements of the sensor electrode occurring in the container, a lateral support occurs by way of the abutment. In this case, moisture film in the zone of the abutment also leads to a leakage current that interferes with the probe's functioning. Such a leakage current occurring in connection with the prior art device between the sensor electrode and the probe housing may lead to inaccurate signals by the probe, i.e., to a signal about a level not conforming to the actual level of the liquid.

With another known probe (German Patent No. 3,026,342), provision is made for a discharge duct for moisture penetrating due to diffusion, such duct leading into the atmosphere. However, it has been found in practical application that in this case too, films of moisture and leakage currents lead to error signals developing between the sensor electrode and the casing of the probe.

SUMMARY OF THE INVENTION

It is an object of the present invention to create a probe for monitoring the level of a liquid, by which functional interferences caused by moisture films are prevented.

The above object is achieved in accordance with the present invention by providing a probe for monitoring a liquid level comprising a probe casing having a pass-through bore with a sealing surface tapering toward an end of the probe removed from the liquid to be monitored; a sensor electrode extending through the pass-through bore and having a countersurface tapering toward the end of the probe removed from the liquid; an insulation sheath jacketing the sensor electrode, the sheath extending from the zone of the sensor electrode on the liquid side thorough the pass-through bore and into the casing of the probe; a first abutment connected in the probe casing on the casing side; a second abutment connected in the probe casing with the sensor electrode and positioned with a spacing from the first abutment; a contact pressure spring engaging with one end close to the liquid the first abutment and engaging with another end removed from the liquid the second abutment; a supporting surface tapering toward the end close to the liquid arranged on the sensor electrode in the probe casing; the insulation sheath extending in the probe casing from the pass-through bore to and beyond the supporting surface; and the second abutment having a pass-through bore with a supporting surface tapering toward the end close to the liquid, the supporting surface enveloping the insulation sheath in the zone of the supporting surface of the sensor electrode.

In the casing of the probe, long uninterrupted sections of insulation can be located between the casing and the end of the insulation sheath, and also between the end of the insulation sheath and the abutment on the electrode side. Because of long sections of insulation, no leakage currents can flow causing an error signal by the probe, even if moisture films may be present. The functioning of the probe is consequently no longer impaired by moisture penetrating through diffusion into the insulation sheath and then migrating from there into the casing of the probe.

In one embodiment of the invention, in the end zone of the insulation sheath, the probe casing has ventilation apertures connecting the interior space of the casing with the external environment of the casing.

These features lead to an intensive aerating of the interior space of the probe casing. Any moisture that might exit from the insulation sheath is evaporated by the ambient air and transported into the atmosphere surrounding the casing of the probe. In this way, the development of moisture films in the casing of the probe is effectively prevented.

In a further embodiment of the invention, a closed connection chamber is provided next to the interior space of the casing of the probe, which space is open to the environment. In the open interior space, the electrical conductors for the signal currents, i.e., the sensor electrode and the conductors connected to the latter, are electrically insulated in an interference-proof way against the adjacent parts and the atmosphere. The electrical conductor and also the signal line leading to the monitoring/evaluating devices extend insulated and sealed into the connection chamber. In the closed connection chamber, the probe can be electrically connected to the signal line and, if necessary, an electronic unit (e.g., a preamplifier) can be located without requiring any special insulation against moisture films.

In a still further embodiment, the end of the insulation on the electrode side is contained by a cap-shaped element surrounding the end of the insulation sheath with formation of a gap therebetween. This embodiment creates a reliable insulation at the end of the insulation sheath and provides at the same time a favorable possibility for moisture to escape from the insulation sheath.

In another embodiment, there is a probe for monitoring a liquid level comprising a probe casing having a pass-through bore with a sealing surface tapering toward an end of the probe removed from the liquid to be monitored; a sensor electrode extending through the pass-through bore and having a counter-surface tapering toward the end of the probe removed from the liquid; an insulation sheath jacketing the sensor electrode, said sheath extending from the zone of the sensor electrode on the liquid side through the pass-through bore and into the casing of the probe; a first abutment connected in the probe casing on the casing side; a second abutment connected in the probe casing with the sensor electrode and positioned with a spacing from the first abutment; a contact pressure spring engaging with its one end close to the liquid the first abutment and engaging with another end removed from the liquid the second abutment; the second abutment is arranged with an axial spacing from the end of the contact pressure spring removed from the liquid; the insulation sheath extends in the probe casing from the pass-through bore beyond the end of the contact pressure spring removed from the liquid to the second abutment; and an electrically insulating spacing piece is arranged outside the insulation sheath between the second abutment and the end of contact pressure spring removed from the liquid.

With this embodiment, very long uninterrupted sections of insulation can be provided in the interior space of the casing of the probe. This insulation is located between the contact pressure spring, which is metallic, as a rule, and consequently electrically conductive, and the end of the insulation sheath, and between the probe casing itself and the end of the insulation sheath.

In a further embodiment, the spacing piece, in its zone close to the end of insulation sheath removed from the liquid, has ventilation apertures connecting the end of the insulation sheath with the interior space of the probe casing. Also, in the end zone of the insulation sheath, the probe casing has ventilation apertures connecting the interior space of the probe casing with the external environment outside of the casing.

This embodiment permits an intensive aeration of the interior space of the casing of the probe, and thus also permits a corresponding venting of the end zone of the insulation sheath. Any moisture that may exit from the insulation sheath is evaporated by the ambient air and transported into the atmosphere surrounding the casing of the probe. In this way, the development of moisture films in the casing of the probe is effectively prevented.

In a still further embodiment, the second abutment and the spacing piece are present in the device as two individual components. Alternatively, the second abutment and the spacing piece are formed as a single component in the shape of a cap surrounding the insulation sheath. Where there are two individual components, provision is made for a venting gap to be positioned between the abutment cap and the insulation sheath with the gap connecting the end of the insulation sheath with the ventilation apertures. On the other hand, where the second abutment and the spacing piece form one single component in the shape of a cap, moisture is given a favorable possibility for escaping from the insulation sheath and for adequate venting of the end zone of the insulation sheath.

In an additional embodiment, the probe casing has a closed connection chamber at its end removed from the liquid, and an electrical conductor having tensile strength extends from the sensor electrode to the connection chamber. The second abutment is supported on the electrical conductor, and the electrical conductor is coated with an insulation between the second abutment and the connection chamber.

This embodiment has a closed connection chamber in addition to the interior space of the casing of the probe, this interior space being open toward the external environment. In the open interior space, the electrical conductors for the signal currents, i.e., the sensor electrode and the conductors connected to the latter, are electrically insulated in an interference-proof manner from the adjacent parts of the device and from the external atmosphere. The electrical conductor and also the signal line leading to the monitoring/evaluating devices are extended and are insulated and sealed into the connection chamber. In the closed connection chamber, the probe can be electrically connected to the signal line and, if necessary, an electronic unit (e.g., a preamplifier) can be located therein without requiring any special insulation against moisture films.

In a further embodiment, the sensor electrode and the electrical conductor possess the properties of bending rigidity and provision is made in the probe casing for a bearing which radially envelops the conductor. This embodiment achieves a particularly effective lateral support for the sensor electrode against pendulum-type movements. This lateral support of the electrode makes it possible that support is not separately required for the sensor electrode abutment.

BRIEF DESCRIPTION OF THE DRAWINGS

Other objects and features of the present invention will become apparent from the following detailed description considered in connection with the accompanying drawings, which disclose several embodiments of the present invention. It should be understood, however, that the drawings are designed for the purpose of illustration only and not as a definition of the limits of the invention.

In the drawing, wherein similar reference characters denote similar elements throughout the several views.

DETAILED DESCRIPTION OF PREFERRED EMBODIMENTS

Figure 1:
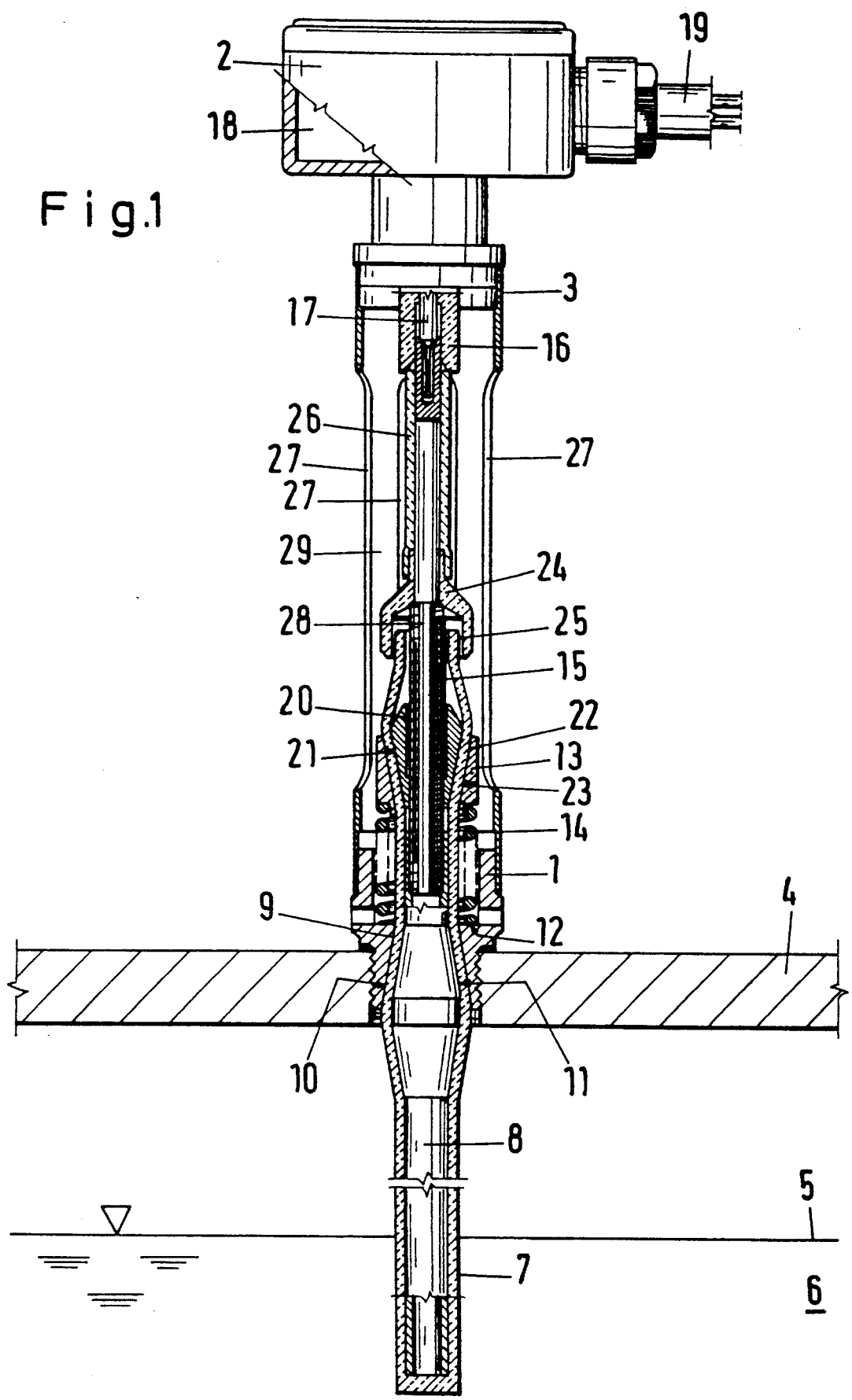
FIG. 1 shows a first embodiment of the probe with a sleeve-shaped abutment surrounding the insulation sheath with a spacing from its end that is removed from the liquid.

Turning now in detail to the drawings, FIG. 1 shows a probe casing having a pass-through part 1, a connection part 2 and a center part 3 arranged in between. With the pass-through part 1, the probe is mounted on a container 4, for example a steam boiler, in which the liquid level 5 of a liquid 6, for example water, is to be monitored by a sensor electrode 8, which projects into the container 4 and which is jacketed there on all sides by an insulation sheath 7.

The pass-through part 1 of the probe casing has a center pass-through bore 9 with a sealing surface 10, which extends all around and is conically tapered toward the end that is removed from the liquid. The sensor electrode 8 extends through the pass-through bore 9 and has a countersurface 11, which also extends all around and is conically tapered toward the end that is removed from the liquid. The two surfaces 10, 11 are disposed opposite one another. The insulation sheath 7 is placed between these two surfaces, extending from the zone of the sensor electrode 8 on the liquid side through the pass-through bore 9 and up into the pass-through part 1 of the probe casing. The pass-through part 1 is provided with a first abutment 12 disposed adjacent to the pass-through bore 9. Spaced at a distance above this abutment 12 is a second abutment 13 which is connected with the sensor electrode 8. A contact pressure spring 14 is clamped between the two abutments 12 and 13. This spring engages the first abutment 12 with its end close to the liquid, and engages the second abutment 13 with its end removed from the liquid.

At its end removed from the liquid, the tubular sensor electrode 8 supports a rod-shaped electrical conductor 15, which extends in the center part 3 of the probe casing toward the connection part 2 of the probe casing. The end of conductor 15 is radially supported by bearing 16. Another conductor 17, which is connected to the conductor 15, leads through the bearing 16 into a connection chamber 18, for which provision is made in the connection part 2 of the casing of the probe. In the connection chamber, the conductor 17 is connected to a signal line 19 which leads to suitable monitoring, control and evaluation devices (not shown in the drawing). The connection chamber 18 is closed on all sides. For this purpose, the conductor 17 and the signal line 19 extend in a sealed manner through the wall of the connection chamber 18.

A sleeve 20 is axially positioned and fixed onto the conductor 15. This sleeve has a conical support surface 21 extending all around and tapered toward the end close to the liquid. The insulation sheath 7 extends in the probe casing 1, 3 from the pass-through bore 9 and beyond the end of the sleeve 20 that is removed from the liquid. In this connection, the sleeve 20 is jacketed by the insulation sheath 7. The abutment 13 has a central pass-through bore 22 with a supporting surface 23 which extends all around and is conically tapered toward the end that is close to the liquid. The two supporting surfaces 21, 13 are disposed opposite one another. Due to the force of the contact pressure spring 14, the supporting surface 23 of the abutment 13 is forced from the outside against the insulation sheath 7, which supports itself on the supporting surface 21 of the sleeve 20. From there, the force of the contact pressure spring 14 is transmitted via the conductor 15 to the sensor electrode 8, through which action the countersurface 11 of the sensor electrode 8, the insulation sheath 7 and the sealing surface 10 of the pass-through part 1 of the probe casing are pressed against each other in a reliably sealed manner.

In the center part 3 of the probe casing, the end of insulation sheath 7 that is removed from the liquid is covered and surrounded by a cap 24 made of insulation material and located on the conductor 15, with a gap 25 existing between the two. From the cap 24 up to the bearing 16, the conductor 15 is enclosed by an insulation 26, and the bearing 16 is made of insulation material as well. The center part 3 of the probe casing has a number of largely dimensioned ventilation apertures 27 laterally extending from the abutment 13 to the bearing 16 via the end of insulation sheath 7 that is removed from the liquid.

When water molecules diffuse from the container 4 through the insulation sheath 7, which, for example, consists of PFTE, to the sensor electrode 8, such water molecules migrate from there through the hollow sensor electrode 8 and a longitudinal groove 28 of the electrical conductor 15 to the end of insulation sheath 7 that is removed from the liquid, and from there to the cap 24. The moisture can escape through the gap 25 into the center part 3 of the sensor casing. An intensive exchange of air occurs between the interior space 29 of the center part and the surrounding external atmosphere due to the ventilation apertures 27. Thus, moisture does not remain in the interior space 29, but escapes into the atmosphere surrounding the probe casing 1, 2, 3.

Moreover, the insulation sheath 7 offers a lengthy section of insulation between its end removed from the liquid and the abutment 13. Should a moisture film nevertheless develop on the insulation of sheath 7, functionally interfering leakage currents will not be generated between the sensor electrode 8 and the pass-through part 1 of the probe casing. Thus, erroneous signals by the probe will be reliably prevented by the lengthy section of insulation. The conductor 15 is insulated against the center part 3 of the probe casing and the connection part 2 of the probe casing by the insulating cap 24, the insulation 26 and the bearing 16, which is insulating as well. This means that leakage currents interfering with the functioning of the probe are prevented there as well. Since the connection chamber 18 is closed on all sides, no moisture penetrates into chamber 18, so that no insulation measures are required there.

Instead of being arranged on the conductor 15, the sleeve 20 having the supporting surface 21 can be mounted on the sensor electrode 8. Also, it would be possible for supporting surface 21 to be located directly on the sensor electrode 8 itself. The abutment 13, in turn, could be formed by two half shells, which have to be joined, instead of consisting of one single piece. If the part of sensor electrode 8 that is disposed in the container 4 has a greater length, this part can be provided with radial bores that facilitate the migration of moisture which has penetrated through the insulation sheath 7 into the longitudinal bore of the sensor electrode 8.

Figure 2:
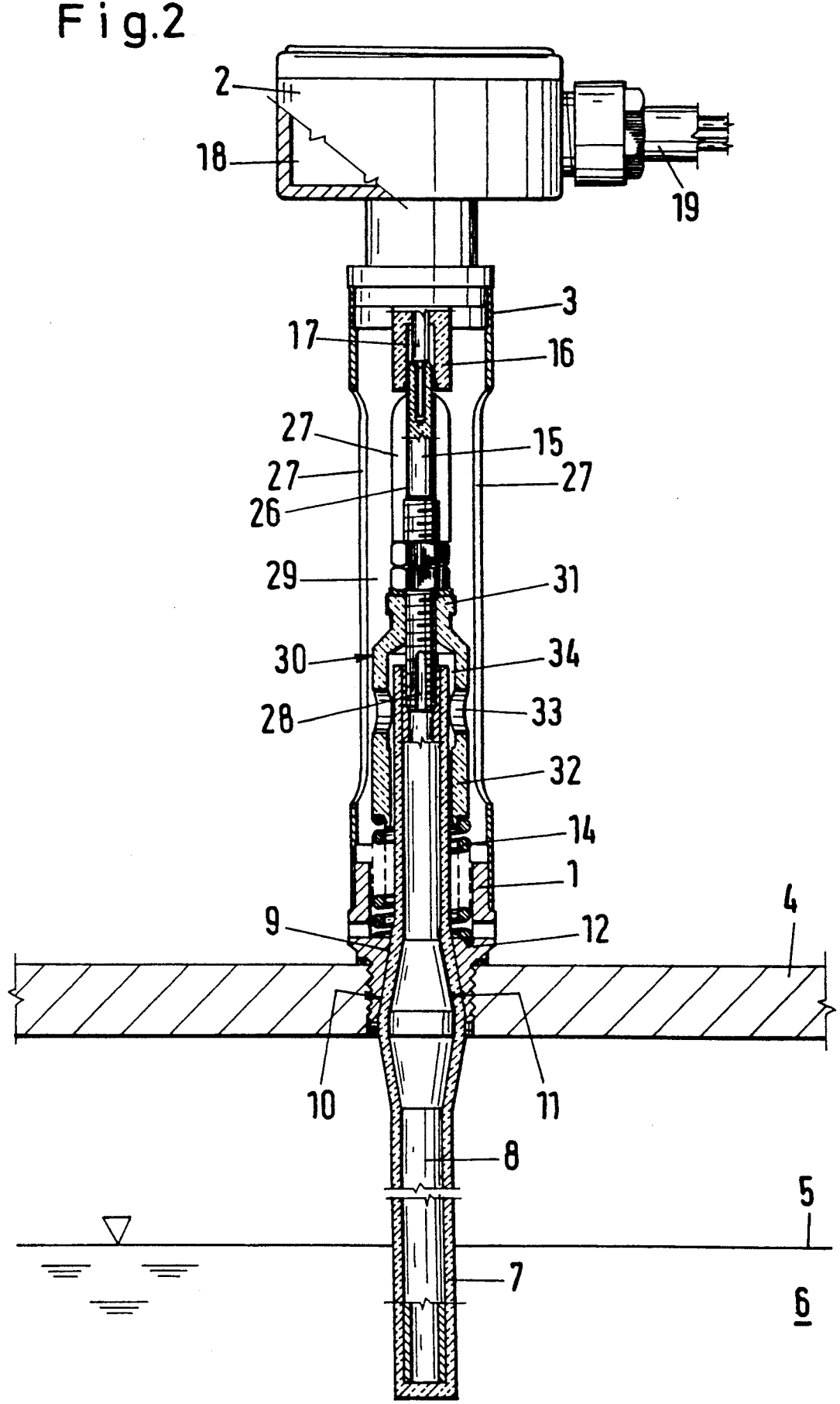
FIG. 2 shows a second embodiment of the probe with a cap-shaped abutment surrounding the insulation sheath from its end that is removed from the liquid.

In FIG. 2, the sensor electrode 8 and the insulation sheath 7 project axially far beyond the end of contact pressure spring 14 that is removed from the liquid. An electrically insulating abutment cap 30 is disposed in the center part 3 of the probe casing. This cap 30 has a face wall 31 and a spacing sleeve 32 connected with the latter. The face wall 31 is arranged axially fixed on the conductor 15 before the end of insulation sheath 7 that is removed from the liquid, and thus with an axial spacing from the end of contact pressure spring 14 removed from the liquid. The face wall 31 functions as a second abutment for the contact pressure spring 14, and this abutment is connected with the sensor electrode 8 by way of the conductor 15. The spacing sleeve 32 surrounds the insulation sheath 7 and extends to the contact pressure spring 14, of which the end removed from the liquid acts on the face side of the spacing sleeve 32. The force of the contact pressure spring 14 is transmitted to the sensor electrode 8 via the abutment cap 30 and the conductor 15. In this way, the countersurface 11 of the sensor electrode 8, the insulation sheath 8 and the sealing surface 10 of the pass-through part 1 of the probe casing are pressed against each other in a reliably sealed manner.

Near the end of insulation sheath 7 that is removed from the liquid, the spacing sleeve 32 has the radial ventilation apertures 33. In addition, a radial ventilation gap 34 extending from the face wall 31 to the ventilation apertures 33 exists between the insulation sheath 7 and the spacing sleeve 32.

The center part 3 of the probe casing has a number of large dimensioned ventilation apertures 27 laterally extending on both sides of the end of insulation sheath 7 that is removed from the liquid. From the abutment cap 30 to the bearing 16, the conductor 15 is enclosed by insulator 26, for example, a tightly fitting coaxial sheath.

When water molecules diffuse from the container 4 through the insulation sheath 7 to the sensor electrode 8, such molecules migrate from there through the hollow sensor electrode 8 and the longitudinal groove 28 of the electrical conductor 15 to the end of insulation sheath 7 that is removed from the liquid, and into the abutment cap 30. Through the ventilation gap 34 and the ventilation apertures 33 the moisture can escape into the center part 3 of the sensor casing. Due to the ventilation apertures 27, an extensive exchange of air occurs between the interior space 29 of the center part and the surrounding external atmosphere. There is also a highly intensive admission of air to the insulation sheath 7 via the correspondingly large-dimensioned ventilation apertures 33. Moisture is thus discharged into the ambient atmosphere surrounding the probe casing 1, 2, 3.

Furthermore, the insulation sheath 7 and the abutment cap 30 provide a very long section of insulation between the end of insulation sheath 7 that is removed from the liquid, and including that found between the end of sensor electrode 8, and the contact pressure spring 14.

Since the sensor electrode 8 and the conductor 15 connected therewith have the property of flexural stiffness and are laterally supported by the bearing 16, any pendulum movement of the sensor electrode 8 that might occur in the container 4 cannot propagate up into the casing of the probe. This prevents damage to the seals on the sealing surface 10, as well as adverse lateral contacts between the abutment 13 and the center part 3 of the probe casing.

While several embodiments of the present invention have been shown and described, it is to be understood that many changes and modifications may be made thereunto without departing from the spirit and scope of the invention as defined in the appended claims.

What is claimed is:

1. Probe for monitoring a liquid level comprising:
   a probe casing having a pass-through bore with a sealing surface tapering toward an end of the probe removed from the liquid to be monitored;
   a sensor electrode extending through the pass-through bore and having a counter-surface tapering toward the end of the probe removed from the liquid;
   an insulation sheath jacketing the sensor electrode, said sheath extending from the zone of the sensor electrode on the liquid side through the pass-through bore and into the casing of the probe;
   a first abutment connected in the probe casing on the casing side;
   a second abutment connected in the probe casing with the sensor electrode and positioned a spaced distance from the first abutment;
   a contact pressure spring engaging with one end close to the liquid the first abutment and engaging with another end removed from the liquid the second abutment;
   a supporting surface tapering toward the end close to the liquid is arranged on the sensor electrode in the probe casing;
   the insulation sheath extending in the probe casing from the pass-through bore to and beyond the supporting surface; and
   the second abutment has a pass-through bore with a supporting surface tapering toward the end close to the liquid, said supporting surface enveloping the insulation sheath in the zone of the supporting surface of the sensor electrode.

2. Probe according to claim 1,
   wherein the probe casing has an interior space and has an external environment; and
   wherein in an end zone of the insulation sheath, the probe casing has ventilation apertures connecting the interior space with the external environment of the casing.

3. Probe according to claim 1, further comprising
   the probe casing having a closed connection chamber at its end removed from the liquid;
   an electrical conductor extending from the sensor electrode into the closed connection chamber; and
   an insulation enveloping the electrical conductor and provided between the end of the insulation sheath and the closed connection chamber.

4. Probe according to claim 3,
   wherein the end of the insulation on the electrode side comprises a cap surrounding the end of the insulation sheath; and
   a gap formed as a spaced distance between said cap and said end of the insulation sheath.

5. Probe for monitoring a liquid level comprising:
   a probe casing having a pass-through bore with a sealing surface tapering toward an end of the probe removed from the liquid to be monitored;
   a sensor electrode extending through the pass-through bore and having a counter-surface tapering toward the end of the probe removed from the liquid;
   an insulation sheath jacketing the sensor electrode, said sheath extending from the zone of the sensor electrode on the liquid side through the pass-through bore and into the casing of the probe;
   a first abutment connected in the probe casing on the casing side;
   a second abutment connected in the probe casing with the sensor electrode and positioned a spaced distance from the first abutment;
   a contact pressure spring engaging with its one end close to the liquid the first abutment and engaging with another end removed from the liquid the second abutment;
   the second abutment is arranged with an axial spacing from the end of the contact pressure spring removed from the liquid;
   the insulation sheath extends in the probe casing from the pass-through bore beyond the end of the contact pressure spring removed from the liquid to the second abutment; and
   an electrically insulating spacing piece arranged outside the insulation sheath between the second abutment and the end of contact pressure spring removed from the liquid.

6. Probe according to claim 5, further comprising:
   said probe casing having an interior space and an external environment;
   ventilation apertures located in the spacing piece in its zone close to the end of insulation sheath removed from the liquid;
   said ventilation apertures connecting the end of the insulation sheath with the interior space of the probe casing; and
   in the end zone of the insulation sheath, the probe casing has ventilation apertures connecting the interior space of the probe casing with the external environment of the casing.

7. Probe according to claim 6,
   wherein the second abutment and the spacing piece comprise an abutment cap surrounding the insulation sheath; and wherein the abutment cap is a spaced distance from the insulation sheath to create a venting gap between the abutment cap and the insulation sheath;

said venting gap connecting the end of the insulation sheath with the ventilation apertures.

8. Probe according to claim 5, further comprising the probe casing having a closed connection chamber at its end removed from the liquid;

an electrical conductor having tensile strength extending from the sensor electrode to the closed connection chamber;

the second abutment supported on the electrical conductor; and an insulation enveloping the electrical conductor and provided between the second abutment and the closed connection chamber.

9. Probe according to claim 1, wherein the sensor electrode and the electrical conductor have bending rigidity; and further comprising a bearing radially enveloping the conductor within the probe casing.

10. Probe according to claim 5, wherein the sensor electrode and the electrical conductor have bending rigidity; and further comprising a bearing radially enveloping the conductor within the probe casing.

* * * * *